Patented Mar. 11, 1924.

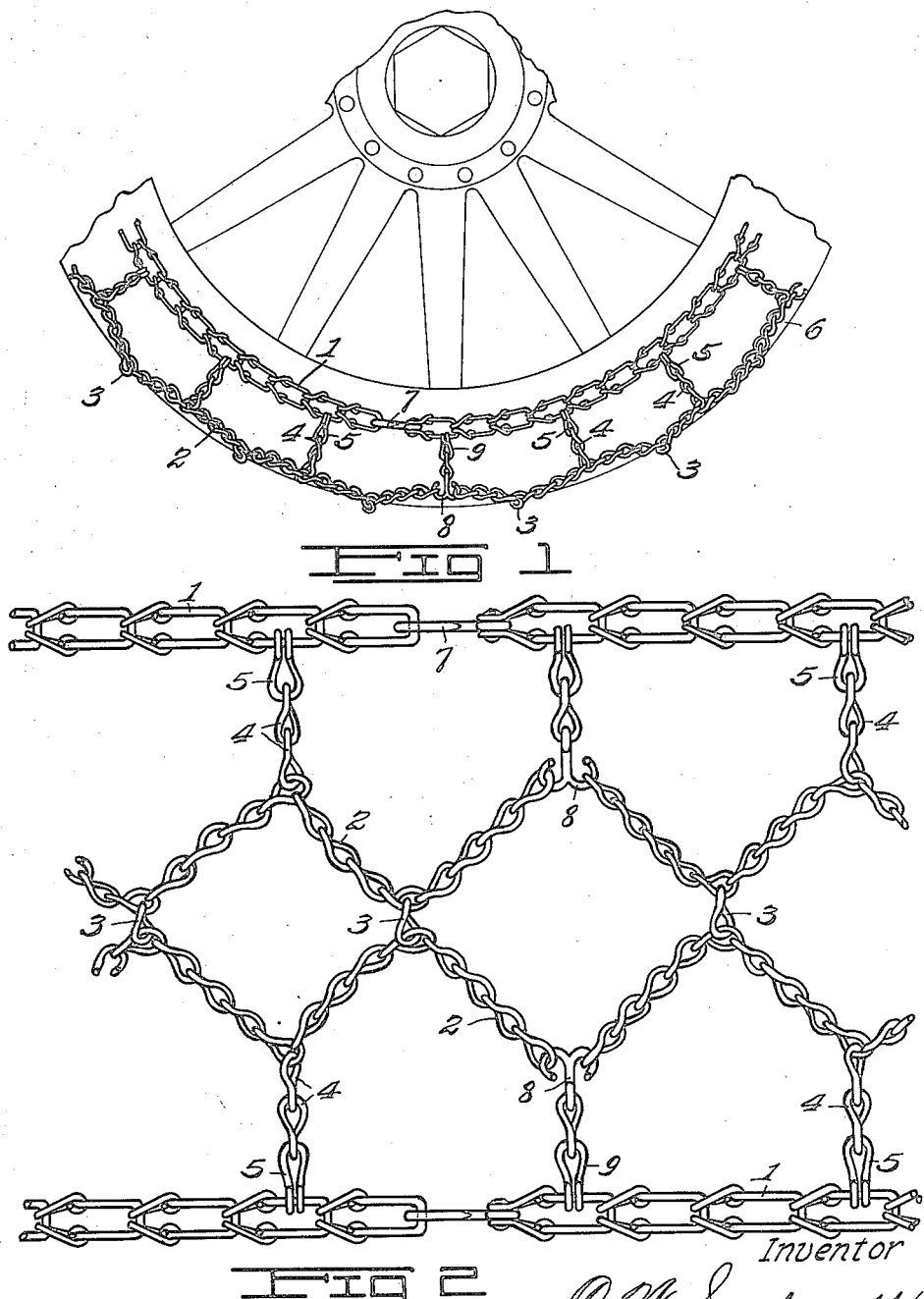

1,486,696

UNITED STATES PATENT OFFICE.

CHARLES W. SNODGRASS, OF MANNINGTON, WEST VIRGINIA.

TIRE CHAIN.

Application filed June 23, 1922. Serial No. 570,439.

*To all whom it may concern:*

Be it known that I, CHARLES W. SNODGRASS, a citizen of the United States of America, and resident of Mannington, county of Marion, and State of West Virginia, have invented certain new and useful Improvements in Tire Chains, of which the following is a specification.

This invention relates broadly to tire chains, and more specifically to a non-skid chain for automobiles.

The primary object of the invention is to provide a simple tire chain structure which provides not only an effective grip upon the roadway for affording traction, but also an efficient side grip for preventing side slipping or skidding.

In describing the invention in detail, reference is herein had to the accompanying drawings, in which—

Figure 1 is a side elevation of a portion of an automobile wheel illustrating the application of my invention; and—

Figure 2 is a plan view of a short length of the chain disposed flatwise.

Referring to said drawings, 1 indicates the circular side chains which may be of the usual or any other preferred construction. Disposed intermediate said side chains are two chains 2, preferably of twisted-link type, which are connected at suitable intervals throughout their length, the connecting means consisting of links 3. Midway between the adjacent links 3 each of the chains 2 is connected by links 4 and hooks 5 to the side chains 1. Thus, each of said chains 2 has a zigzag disposition and said chains are relatively disposed to form a succession of diamond shaped figures, as shown.

It will be noted that each of the chains 2 is continuous throughout the entire circumference of the tire 6 upon which the tire chain is fitted, and is not composed of a plurality of short chain lengths connected at intervals as has heretofore been proposed. Thus when chains 2 become worn they may be readily replaced by new chains of full lengths.

While two or more links in alined coupled relation might be substituted for the single twisted link 3, I prefer to employ the latter, thus bringing the two thereby-attached portions of the chains 2 more nearly into meeting relation on the central tread portion of the tire to afford an effective traction grip.

The meeting ends of the side chains 1 may be detachably connected by any appropriate form of connector links, or by hooks 7. For connecting the meeting ends of the chains 2 I prefer to employ couplings 8 of triple-hook form, two oppositely disposed hooks thereof being adapted to engage the meeting ends of a chain, while the third hook permanently connects to the adjacent side chain 1 either directly or through the intermediacy of links and a clincher hook 9 of a common form.

What is claimed is—

A tire chain comprising circular side chains, a pair of continuous twisted-link chains intermediate said side chains, a single cross link coupling together said twisted-link chains at regular intervals throughout the lengths of the latter, and a series of alined cross links connecting said side chains to said twisted-link chains at points midway between said single-link couplings, thereby to form a succession of diamond-shaped figures located remote from said side chains and adapted to rest in substantial entirety upon the tread portion of a tire.

In testimony whereof, I affix my signature in presence of two subscribing witnesses.

CHARLES W. SNODGRASS.

Witnesses:
VIRGINIA K. LEIGH,
ELIZABETH KNOTTS.